United States Patent
Kawaguchi et al.

(10) Patent No.: US 8,208,791 B2
(45) Date of Patent: Jun. 26, 2012

(54) AUTHORING DEVICE, AUTHORING METHOD, AUTHORING PROGRAM, AND RECORDING MEDIUM CONTAINING THE PROGRAM

(75) Inventors: Yoshifumi Kawaguchi, Kyoto (JP); Hideki Taniguchi, Kyoto (JP)

(73) Assignee: Panasonic Corporation, Osaka (JP)

( * ) Notice: Subject to any disclaimer, the term of this patent is extended or adjusted under 35 U.S.C. 154(b) by 1038 days.

(21) Appl. No.: 11/660,391

(22) PCT Filed: Aug. 5, 2005

(86) PCT No.: PCT/JP2005/014435
§ 371 (c)(1),
(2), (4) Date: Mar. 18, 2008

(87) PCT Pub. No.: WO2006/018993
PCT Pub. Date: Feb. 23, 2006

(65) Prior Publication Data
US 2008/0292264 A1    Nov. 27, 2008

(30) Foreign Application Priority Data
Aug. 17, 2004 (JP) ................................ 2004-237159

(51) Int. Cl.
*H04N 9/80* (2006.01)
(52) U.S. Cl. ......... 386/248; 386/283; 386/330; 386/332
(58) Field of Classification Search .................. 386/330, 386/332, 248, 283
See application file for complete search history.

(56) References Cited

U.S. PATENT DOCUMENTS

| 6,096,095 A * | 8/2000 | Halstead ........................ 717/107 |
| 6,393,196 B1 * | 5/2002 | Yamane et al. ................ 386/281 |
| 2002/0159758 A1 | 10/2002 | Okuyama et al. |
| 2003/0091330 A1 | 5/2003 | Shibutani |
| 2003/0167435 A1 | 9/2003 | Shih et al. |
| 2004/0067044 A1 | 4/2004 | Hsu et al. |
| 2005/0094968 A1 * | 5/2005 | Green et al. ..................... 386/52 |

FOREIGN PATENT DOCUMENTS

| EP | 1 313 103 | 5/2003 |
| JP | 10-155135 | 6/1998 |
| JP | 11-288562 | 10/1999 |
| JP | 2002-330405 | 11/2002 |
| JP | 2003-153200 | 5/2003 |

OTHER PUBLICATIONS

Supplementary European Search Report issued Feb. 10, 2010 in Application No. EP 05 76 8902.

* cited by examiner

*Primary Examiner* — Nabil El Hady
(74) *Attorney, Agent, or Firm* — Wenderoth, Lind & Ponack, L.L.P.

(57) ABSTRACT

An authoring device includes: a separator for separating a video stream and an audio stream from the input stream; a multiplexer for multiplexing the video stream and the audio stream to generate content information and further generating control information for managing stream reproduction, generating, from content information and control information, incomplete disc image data which is a series of data basically based on a predetermined format and in which a part of reproduction control information defined by a predetermined format is missing, and further generating analysis information required for generating the missing part of the reproduction control information; and a disc image completing section for completing the incomplete disc image data by referencing the analysis information after generation of the incomplete disc image data.

9 Claims, 8 Drawing Sheets

Fig.6

| 399 VOBU IDENTIFICATION NUMBER | 400 LOCATION INFORMATION | 401 VOBU START TIME INFORMATION | 402 AUDIO PACK PTS | 403 AUDIO PACK LOCATION INFORMATION | 402 AUDIO PACK PTS | 403 AUDIO PACK LOCATION INFORMATION | ... |
|---|---|---|---|---|---|---|---|
| 1 | 1000 | 0 | | | | | ... |
| 2 | 2000 | 100 | | | | | ... |
| 3 | 3000 | 200 | | | | | ... |

404 VOBU END TIME INFORMATION

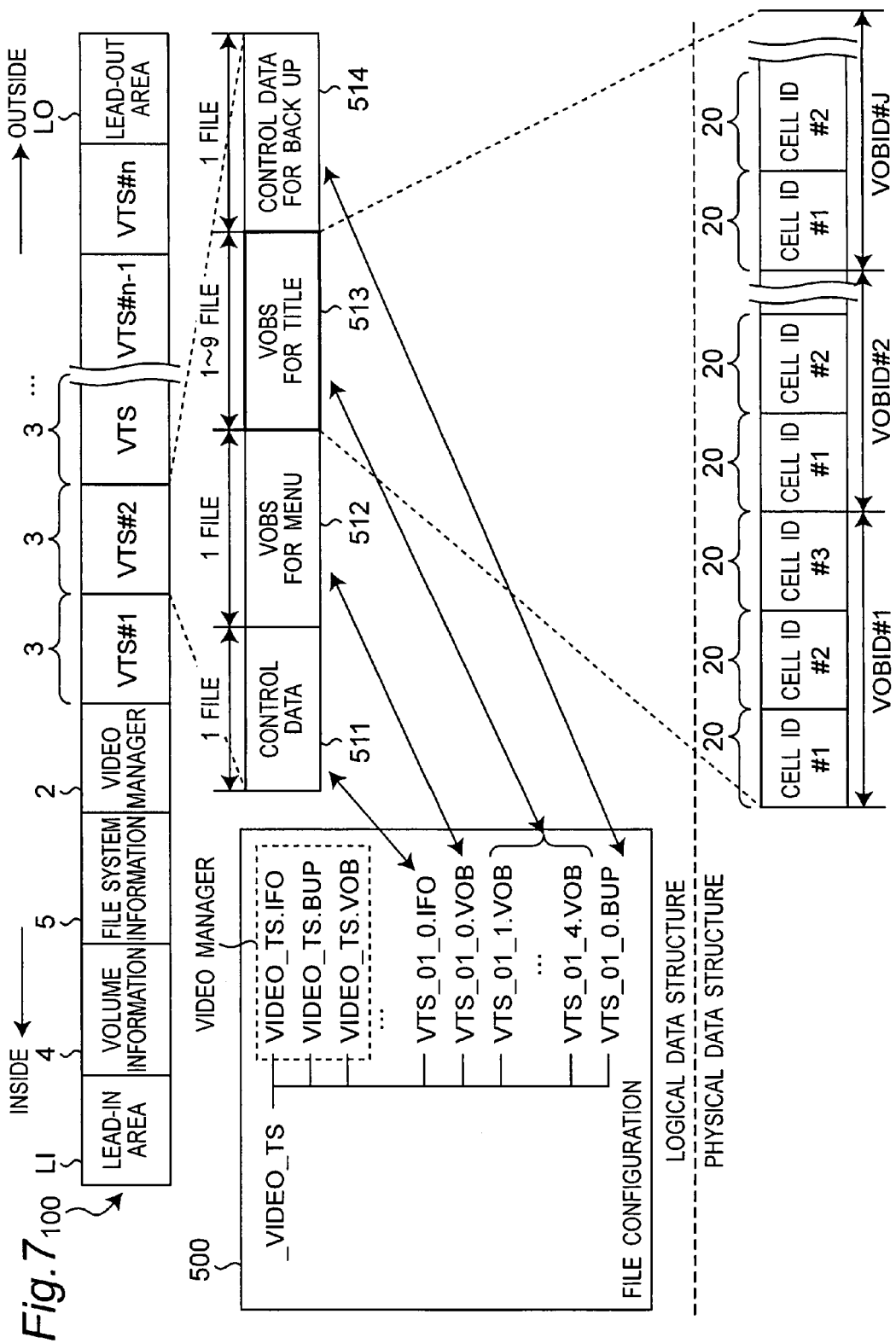

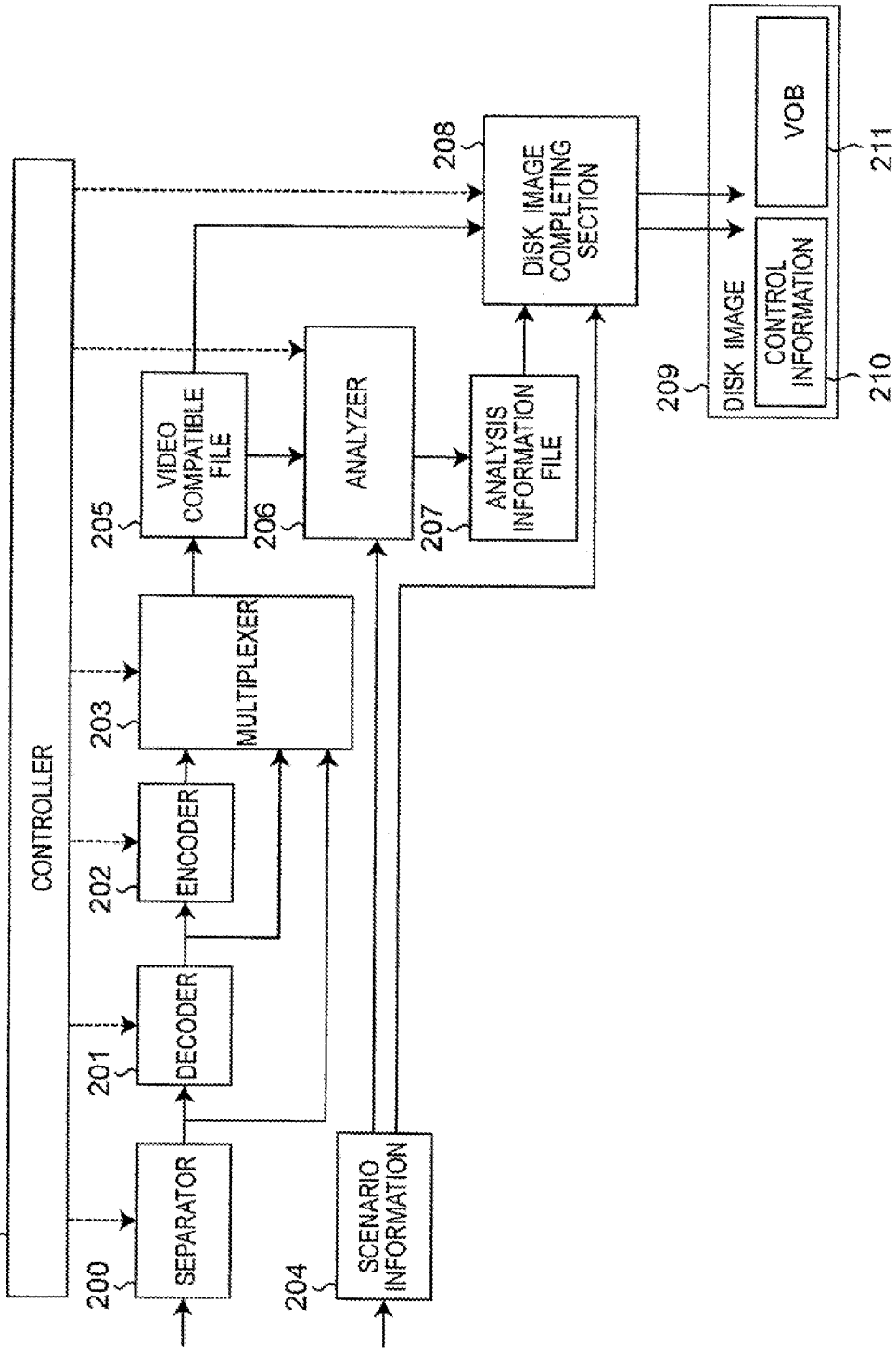

AUTHORING DEVICE, AUTHORING METHOD, AUTHORING PROGRAM, AND RECORDING MEDIUM CONTAINING THE PROGRAM

TECHNICAL FIELD

The present invention relates to an authoring device and an authoring method, for recording contents such as video information onto a recording medium.

BACKGROUND ART

There has recently been a significant tendency to enlarge recording capacity in the field of optical disks, and with such enlargement, for example, a DVD (Digital Versatile Disk) is coming into common use as an optical disk in which one movie or the like is compressed and recorded.

Recording format for recording video information (hereinafter referred to as "content") such as a movie to a DVD having a large recording capacity as described above, basically conforms to an MPEG system. The recording format further has standards specific to the DVD. Such recording format includes DVD-Video format, and DVD Video-Recording format.

The DVD-Video format is a format compatible with a Read-only DVD format. The DVD-Video Recording format is not compatible with the Read-only DVD format, but enables editing recorded contents information with ease, and thus suitable for recording onto an optical disk in real time. According to the DVD-Video format, contents are typically recorded by an authoring method in which recording is made regardless of real time.

A conventional authoring method is described with reference to FIG. 8. It is to be noted that a case is described below where content in a format other than the MPEG2 standard is converted into a stream in conformity with a DVD-Video standard, and then recorded. The following process by each of processing sections is controlled by a control section 212.

Inputted contents are separated into an audio stream and a video stream by a separator 200, decoded by a decoder 201, and then encoded by an encoder 202 so as to conform to the MPEG2 standard. The audio stream and the video stream are multiplexed by a multiplexer 203, to be outputted as a video compatible file 205. Here, the video compatible file 205 is a stream which conforms to the MPEG2 format, in a bit rate, a GOP structure, an audio format, or the like and further conforms to the DVD-Video standard.

However, the video compatible file 205 does not fully satisfy the DVD-Video standard, and lacks part of reproduction control information. It is to be noted that the reproduction control information is information for controlling a reproduction mode in a stream, for example, is navigation information in the DVD standard.

Therefore, an analyzer 206 analyzes all streams in the video compatible file 205 based upon scenario information 204 inputted separately from the stream. According to this analysis, an analysis information file 207 is generated which includes reproduction control information required in generating a final disk image 209.

A disk image completing section 208 puts the analysis information file 207 and the video compatible file 205 corresponding thereto together to construct title data, for completion of the disk image 209 (control information 210 and a VOB 211).

Finally, the disk image 209 generated in the above procedure is recorded onto an optical disk in a disk-at-once method (not allowing additional recording).
Patent Document 1: JP-A-10-155135.

SUMMARY OF THE INVENTION

In the above-mentioned conventional system, an area for storing the video compatible file 205 and an area for storing the disk image 209 are required as a working area required for the operation. Namely, a working area with a capacity twice as large as that of the whole stream is required. Hence there is a problem in that a large amount of hard disk capacity is consumed when a DVD is generated by means of the DVD-Video format on a personal computer.

Further, the video compatible file 205 is generated from an input stream (first scanning). Then, the whole video compatible file 205 is analyzed to generate the analysis information file 207 (second scanning). Then, with reference to the video compatible file 205 and the analysis information file 207, the disk image 209 is generated (third scanning). As thus described, since the whole stream is scanned three times, there is a problem in that the I/O process frequently occurs to result in large processing time required for generation of the DVD.

The problem to be solved by the invention is to improve the requirement for an enormous working area in authoring and to make a converting process more efficient, thereby reducing the authoring time.

Solving Means

In a first aspect of the present invention, there is provided an authoring method for recording an input stream as a stream in a predetermined format to a recording medium. According to the authoring method, an input stream is separated into a video stream and an audio stream. Content information is generated by multiplexing the video stream and audio stream. Control information for managing reproduction of a stream is generated. Incomplete disk image data is generated based on the content information and control information. The incomplete disk image data is a series of data which is basically in conformity with the predetermined format. The incomplete disk image data includes reproduction control information which is defined by the predetermined format and has lacking part. Analysis information required for generating the lacking part of the reproduction control information is generated, simultaneously with the generating of the incomplete disk image data. The incomplete disk image data is completed by rewriting the lacking part of the reproduction control information with reference to the analysis information after the generating of the incomplete disk image data.

In a second aspect of the present invention, there is provided an authoring device for recording an input stream as a stream in a predetermined format to a recording medium. In the authoring device, a separator separates an input stream into a video stream and an audio stream. A multiplexer generates content information by multiplexing the video stream and audio stream, generates control information for managing reproduction of a stream, generates incomplete disk image data based on the content information and control information. The incomplete disk image data is a series of data which is basically in conformity with the predetermined format. The incomplete disk image data includes reproduction control information which is defined by the predetermined format and has lacking part. The multiplexer generates analysis information required for generating the lacking part of the reproduction control information, simultaneously with the generating of the incomplete disk image data. A disk image completing section completes the incomplete disk image data by rewriting the lacking part of the reproduction control information with reference to the analysis information after the generating of the incomplete disk image data.

Effects of the Invention

According to the present invention, incomplete disk image is generated on the hard disk in first scanning of an inputted stream, and then the incomplete disk image is scanned (second scan) to complete the disk image. Hence, scanning of the whole stream is performed just twice, and thus no working area used for storing an intermediate file is required and number of times of I/O is reduced. This can lead to reduction in recording capacity and processing time required for the authoring process, thereby enabling realization of high-speed authoring as well as improvement in operability in a typical personal computer.

BRIEF DESCRIPTION OF DRAWINGS

FIG. 6 is a view showing contents of analysis information constructed in a multiplexer of the authoring device.

FIG. 7 is a view showing the relation between a volume space and logical data structure of a DVD-Video disk.

FIG. 8 is a view showing a configuration of a conventional authoring device.

REFERENCE SIGNS

Figure 1:
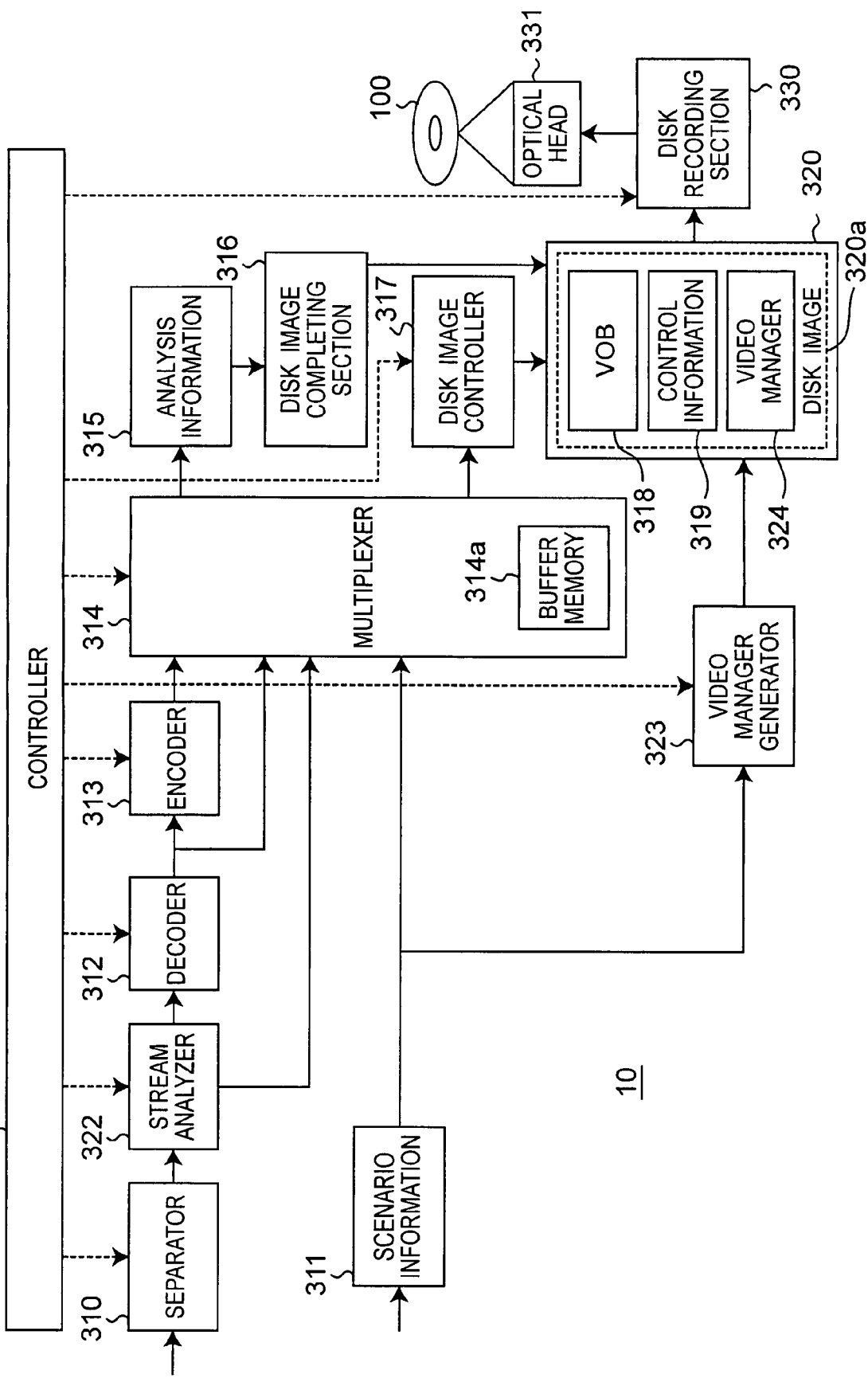
FIG. 1 is a view showing a configuration of an authoring device according to the present invention.

10 Authoring device
41 Navigation (Navi) pack
100 DVD
310 Separator
311 Scenario information
312 Decoder
313 Encoder
314 Multiplexer
315 Analysis information
316 Disk image completing section
317 Disk image controller
318 VOB
319 Control information
320 Data storing section
320a Disk image
321 Controller

DETAILED DESCRIPTION OF THE INVENTION

In the following, an embodiment preferred for the present invention is described with reference to attached drawings.

It is to be noted that in the following, a DVD-R/RW (DVD-Recordable/Rewritable) is used as a recording medium, and an example is described, in which content is recorded onto the recording medium in conformity to a DVD-Video standard as one of recording format standards for video information such as a movie.

1. Configuration of Authoring Device

An authoring device in the present embodiment described below conforms to the DVD-Video standard, and constructs a final disk image while efficiently dividing an input stream on a memory with almost no temporal working area required. The authoring device converts, for the time being, the inputted stream into a format in conformity with the DVD-Video standard, to generate an incomplete disk image including dummy information. Subsequently, the authoring device rewrites the dummy information in the incomplete disk image to proper information, to generate a final, namely complete, disk image. As thus described, the authoring device is capable of completing authoring by performing the stream scanning process twice (hereinafter referred to as "two-pass process"). It is thereby possible to reduce processing time and a capacity of a working area required for the authoring process.

FIG. 1 shows the configuration of the authoring device according to the present invention. As components for an authoring function, an authoring device 10 has a separator 310 for separating an input stream into an audio stream and a video stream, a stream analyzer 322 for analyzing a stream, a decoder 312 for decoding the stream, an encoder 313 for encoding the stream, and a multiplexer 314 for multiplexing the audio stream and the video stream. The multiplexer 314 includes a buffer memory 314a.

Further, the authoring device 10 has a disk image controller 317 for receiving an output from the multiplexer 314 to generate an incomplete disk image, a disk image completing section 316 for performing a process for completing the incomplete disk image, a video manager generator 323 for generating a video manager 324 from scenario information 311, and a data storing section 320 for storing the disk image. The data storing section 320, for example, is a hard disk device. Here, the scenario information 311 includes information for setting an entry point which is defined in the DVD-Video standard, namely information showing an arrangement position for dividing a cell 20. The video manager 324 is menu information with respect to a file to be finally recorded onto a DVD 100.

The authoring device 10 further has a disk recording section 330 and an optical head 331 as means for recording information onto the optical disk 100. The disk recording section 330 reads the completed disk image from the data storing section 320, and records the read disk image onto the optical device 100 via the optical head.

The authoring device 10 further includes a controller 321 for controlling operations of the processing sections constituting the authoring device 10, such as the separator 310 and the decoder 312, to realize a variety of functions of the authoring device 10.

It is to be noted that the functions of the authoring device 10 as described below which are realized by the separator 310, the stream analyzer 322, the decoder 312, the encoder 313, the multiplexer 314, the disk image completing section 316, the disk image controller 317 and the control section 321, can be achieved by software executed on a computer. However, the functions of the authoring device 10 may be achieved by execution of hardware.

2. Outline of Recording Format

Before description of a specific operation of the authoring device 10, the outline of the DVD-Video standard as a recording format, to which the authoring device 10 should conform, is described with reference to FIGS. 2 to 5.

(Physical Format)

Figure 2:
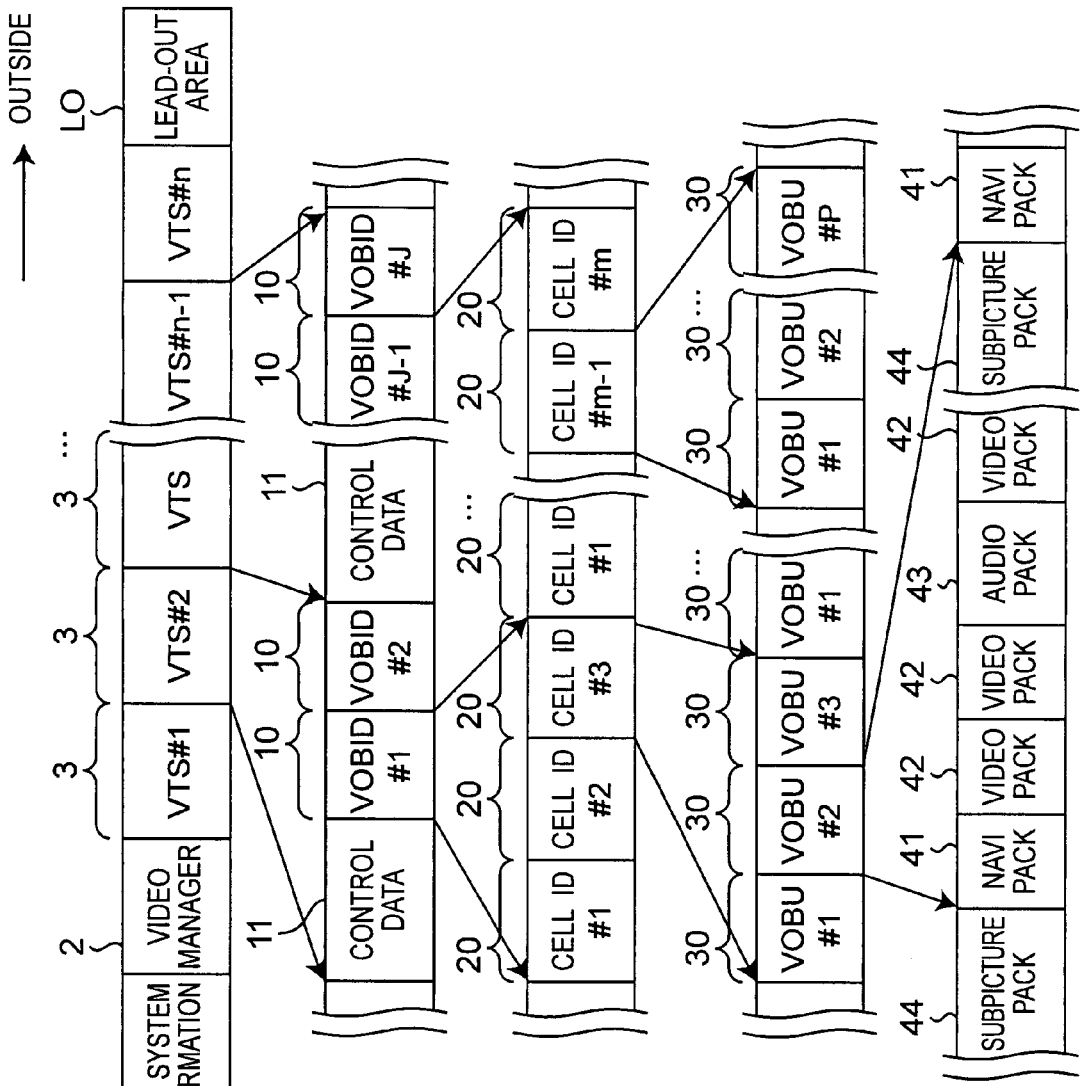
FIG. 2 is a view showing a physical recording format in a DVD video standard.

As shown in FIG. 2, the DVD 100, on which recording information is recorded in conformity with the DVD-Video standard (including a DVD-R which is recordable only once, a DVD-RW which is rewritable a plurality of times, and so on), has a lead-in area LI at the innermost periphery and a lead-out area LO at the outermost periphery. Video information and audio information are divided into a plurality of VTSs (Video Title Sets) 3 (VTS #1 to VTS #n) having respective ID (identification) numbers, to be recorded on a region between the lead-in area LI and the lead-out area LO.

The VTS 3 is a set including related titles. The title means one piece of work that a producer of a movie or the like intends to present to the audience. The related titles mean titles that include the same number of pieces of audio information and sub video information (information of sub images such as subtitles in a movie) and the same attributes (specification, available languages, and so on). For example, the VTS 3 is recorded with a plurality of movies with lines in different languages with respect to the same movie having respective titles. Alternatively, the VTS 3 is recorded with different titles with a theater version and a special version with respect to the same movie. Therefore, the VTS (Video Title Set) 3 is an aggregation of titles and menus, and more specifically, as shown in FIG. 7, the VTS 3 includes control data 511 for controlling titles and menus in the VTS 3, VOBS 512 for menu, VOBS 513 for title, and control data 514 for backup.

A video manager 2 is recorded onto a region immediately before the region where the VTS 3 is recorded. Information to be recorded as the video manager 2 may be VMGI (Video Manager Information), and the VMGI includes information concerning the whole of video information and audio information which are recorded onto the DVD 100, such as menus showing names of the respective titles, information for protection against illegal copy, an access table for accessing the respective titles, and backup information of these pieces of information.

Further, volume information 4 for identifying the whole information recorded on the DVD 100 and file system information 5 showing file structures of data in the video manager 2 and the VTSs 3 are recorded on between the video manager 2 and the lead-in area LI.

The VTS 3 includes control data 11 positioned at the head and a plurality of objects (which are video objects, hereinafter referred to as "VOBs", in the present embodiment since being video information) 10 as contents information. Other than control information, entity parts (video data or audio data itself other than control information) of video information and audio information are recorded onto each of the VOBs 10. Namely, contents information is divided and recorded onto the plurality of VOBs 10. Each of the VOBs 10 is provided with an ID number.

A portion composed of the plurality of VOBs 10 is called a VOB set (VOBS). This VOB set serves to identify the entity parts of the video information and the audio information to distinguish the control data 11 constituting the VTS 3 from the plurality of VOBs 10 being the entity parts.

In the control data 11 recorded onto the head of the respective VTSs 3, information such as PGCI (Program Chain Information) as a variety of information concerning a program chain as a logical segment obtained by combination of later-described plurality of cells, and VTSI (Video Title Set Information) as backup information thereof.

Further, each of the VOBs 10 is composed of a plurality of cells 20 having respective ID numbers. Each of the VOBs 10 is configured so as to be completed by the plurality of cells 20. Namely, each of the cells 20 in one VOB 10 does not extend another VOB 10.

Each of the cells 20 composed of a plurality of VOB units (VOBU) 30 having respective ID numbers. The VOB unit 30 is unit information including video information, audio information and sub video information. Each of the VOB units 30 is composed of a pack (hereinafter referred to as "navigation pack") 41 showing navigation information storing the control information with respect to data and the like included in each of the VOB units 30, video data (video pack) 42 as video information, audio data (audio pack) 43 as audio information, and sub picture data (sub picture pack) 44 for sub video information. Only, image data is recorded as the video data 42, and only sound data is recorded as the audio data 43. Further, only graphic data such as text and figures as sub videos are recorded as the sub picture data 44.

Further, each of the VOB units 30 is recorded such that the reproduction time for data included therein (reproduction time for data recorded between one navigation pack and a navigation pack located ahead of or behind the one navigation pack) is not shorter than 0.4 seconds and not longer than 1 second. Hence the navigation pack 41 is certainly detected once in every 0.4 to 1 second at reproduction.

Further, in each of the VOB units 30, the navigation pack 41 is arranged at the head of VOB unit, and the video data 42, the audio data 43, and the sub picture data 44 follows the navigation pack 41. However, the respective data of the video data 42, the audio data 43, and the sub picture data 44 are not necessarily required to be present in the VOB units 30, and even when the data are present, the number and order thereof can be arbitrarily set. In addition, it is defined in the standard that eight types of sounds are recordable and 32 types of sub images are recordable onto the DVD 100.

The video data 42, the audio data 43 and the sub picture data 44 are managed by units of "pack", respectively. Namely, in each of the VOB units 30, the video data 42, the audio data 43 and the sub picture data 44 are divided into respective packs and then recorded. It is to be noted that all the video data 42 included in the VOB units 30 are each composed of one or a plurality of GOPs (Groups Of Pictures).

The GOP is the minimum singly reproducible image unit defined in the standard of the MPEG2 format as a video compression system adopted in recording video information onto the DVD 100 according to the present embodiment, and each of the GOPs includes, at the head of GOP, information of reproduction display time called PTS (Presentation Time Stamp), showing the reproduction time, on a reproduction time axis, of the video data 42 included in the GOP. This MPEG2 format is described later.

Further, the pack recorded with the video data 42 is called a "video pack", the pack recorded with the audio data 43 is called an "audio pack", and the pack recorded with the sub picture data 44 is called a "sub picture pack". Further, time information called an SCR (System Clock Reference) is recorded to a pack header which is recorded at the head of each pack. The SCR shows read start time on the reproduction time axis, at which data included in each pack is read from a track buffer of an information reproducing device for reproducing information recorded on the DVD 100 and input of the read data to the respective buffers starts.

The navigation pack 41 is reproduction control information with respect to the video and audio information included in the VOB unit including the navigation pack 41 is included. The navigation pack 41 includes DSI data as retrieval information for retrieving a picture or a sound intended to be reproduced and displayed, and PCI data as information concerning reproduction display control in reproducing a picture or a sound when retrieval is performed based upon the DSI data. The DSI data is, for example, an address on the DVD 100 at which the picture, sound or the like intended to be reproduced and displayed are recorded.

The PCI data includes high light information defining a display and an operation in selecting each of select items to be selected by the user. According to the high light information, for example, a change is made in screen display with respect to the item selection in an image (so-called menu screen) displaying items to be selected by the user, and commands with respect to a displayed position to be changed in correspondence with the selection and the selected item (command showing an operation to be executed with respect to the selected item), and the like, are set. Picture information for displaying a frame, a select button or the like which is required for constructing and displaying a menu screen is recorded as the sub picture data 44 as sub video information. It is to be noted that details of the DSI data and the PCI data are described later.

The outline of the MPEG2 format for compressing video data which is adopted in the present embodiment is described.

Generally, in sequential frame images, there are often cases where frame images located before and after one frame image are similar to each other and have an interaction. MPEG2 format focuses upon this respect, and the MPEG2 format generates, based upon a plurality of frame images transmitted at an interval of several frames, another frame image present between those plurality of frame images is generated by interpolation with a motion vector of an original image or the like.

When recording the another frame image, only by recording information concerning a difference between the another frame and the plurality of frame images and the motion vector, it is possible to estimate and reproduce above-mentioned another frame image from the plurality of frame images with reference to the recorded data. Thereby, image compression recording becomes possible.

(Outline of GOP)

Figure 3:
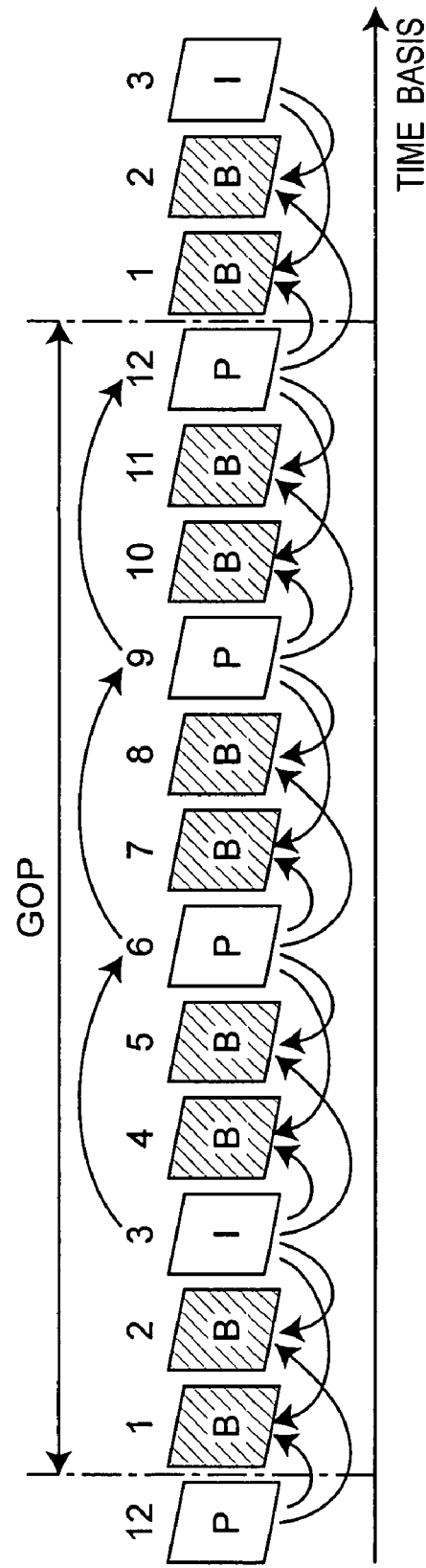
FIG. 3 is a view showing a configuration of a GOP in the DVD-Video standard.

Next, outline of the GOP is described with reference to FIG. 3. It is to be noted that FIG. 3 shows an example of a plurality of frame images composing each GOP. FIG. 3 shows a case where each GOP is composed of twelve frame images (in the MPEG2 format, the number of frame images included in each GOP is not fixed). In the figure, a frame image indicated by "I" is called an I picture (intra-coded picture), which is a frame image capable of reproducing a complete frame image by its own image alone. A frame image indicated by "P" is called a P picture (Predictive-coded picture), which is a predictive picture generated, for example, by decoding a difference from a predictive picture which is compensated and reproduced based upon the already decoded I picture or another P picture. A frame image indicated by "B" is called a B picture (Bi-directionally predictive-coded picture), which is a predictive image reproduced by use of not only the already decoded I picture or P picture, but also a temporally future I picture or P picture which is recorded on an optical disk or the like, for prediction. It is to be noted that, in FIG. 3, predicting relations (interpolation relations) among the pictures are indicated by arrows.

In the typical MPEG2 format used for the DVD 100 of the present embodiment, a variable rate system is adopted in which an amount of data included in each GOP is not fixed. Namely, when each of pictures included in one GOP corresponds to a moving image with fast movement and the correlations among the pictures are small, the amount of data for composing the picture increases, whereby the amount of data included in one GOP also increases. In the meanwhile, when each of the pictures included in each GOP corresponds to a moving image with little movement and the correlations among the pictures are large, the amount of data for composing the picture decreases, whereby the amount of data included in each GOP decreases.

(Data Structure of PCI Data and DSI Data)

Figure 4:
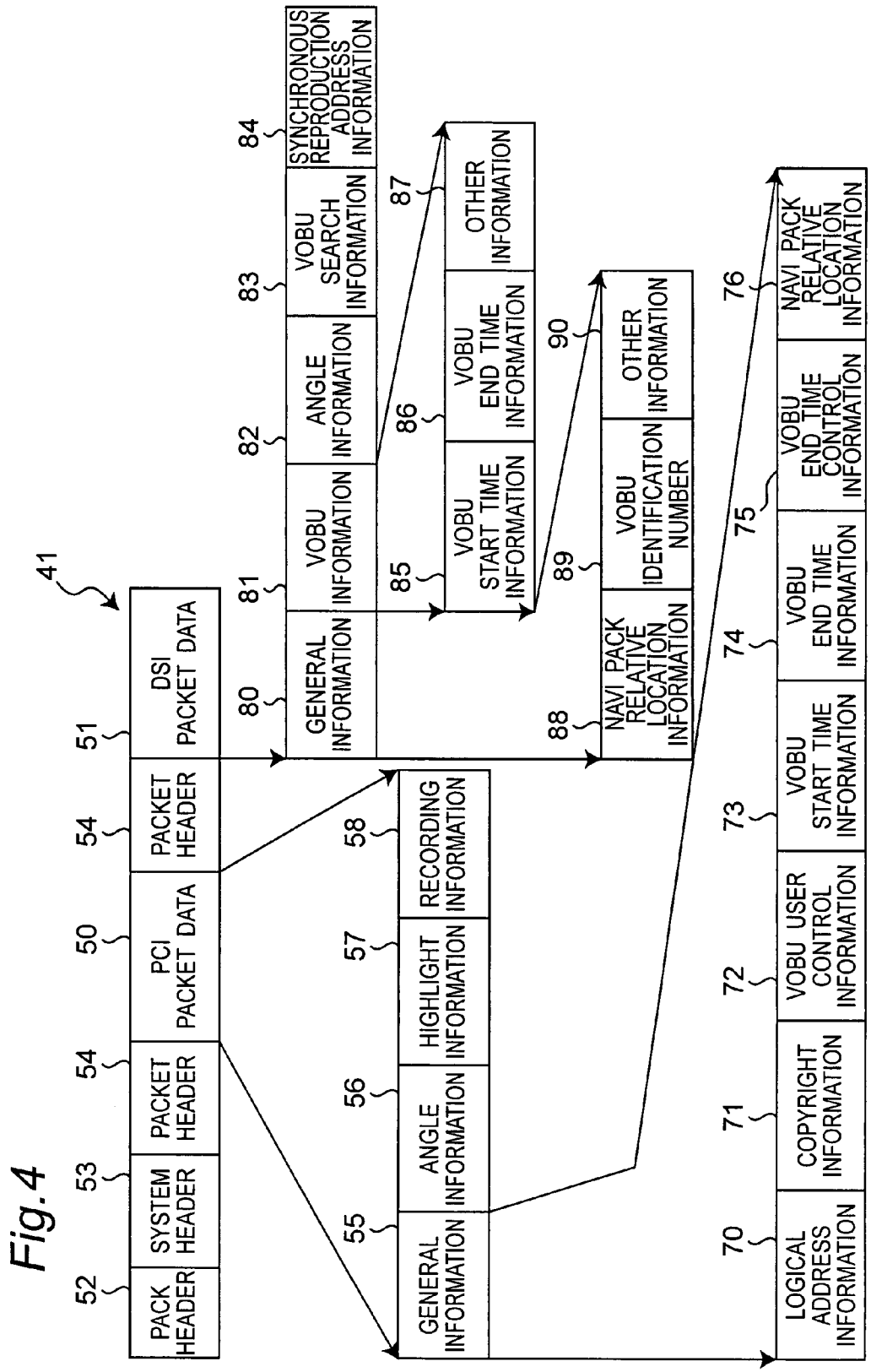
FIG. 4 is a view showing a physical recording format (especially, navigation pack data structure) in the DVD-Video standard.

Next, physical data structures of the PCI data and the DSI data are descried with reference to FIG. 4. FIG. 4 is a view showing a physical recording format in the DVD-Video standard, especially a data structure of the navigation pack. The PCI data and the DSI data included in the navigation pack 41 are composed of: PCI packet data 50 having real data of the PCI data; DSI packet data 51 having real data of the DSI data; a pack header 52 having information such as a physical address (Pack Start Code) where the pack is recorded and an SCR; a system header 53 having a physical address (System Header Start Code) where a system header of the pack is recorded and attribute information of a data stream; and each of packet headers 54.

As shown in FIG. 4, the PCI packet data 50 is composed of: general information 55 as a body of the PCI data; angle information 56 storing information for multi-angles; high light information 57 storing menu display information that is displayed for selection of multi-angle display; and recording information 58 as an ISRC (International Standard Recording Code) in conformity with ISO (International Standardization Organization) 3901. ISRC shows information such as a country code and a contents holder code in a sub code used for a CD (Compact Disc) and the like.

The general information 55 is composed of logical address information 70 showing numbers of logical blocks previously set from the head of the VOB 10 of the navigation pack 41, information on copy protection, namely copyright information 71 showing copyright information, user control information 72 showing control on a user operation in the VOB unit 30, VOBU start time information 73 showing reproduction start time on the reproduction time axis of the VOB unit 30 including the navigation pack 41, VOBU end time information 74 showing reproduction finish time on the reproduction time axis of the VOB unit 30, VOBU finish time limit information 75 showing reproduction limit finish time on a reproduction time axis different from the VOBU end time information in the VOB unit 30, and navigation pack relative location information 76 as a relative recording address information from the first video frame of the cell to the first frame of the VOB units 30.

The DSI packet data 51 is composed of general information 80 as a body of the DSI data, VOB information 81 as information concerning the VOB 10 to which the navigation pack 41 belongs, angle information 82 which stores information for multi-angles, VOBU search information 83 showing recording positions of VOB units 30 on the DVD 1, the VOB units to be reproduced before and after the VOB unit 30 to which the navigation pack 41 belongs, and synchronous reproduction address information 84 showing address information for synchronous reproduction of video data and audio data.

The general information 80 is composed of: navigation pack relative location information 88 similar to the logical address information 70, a VOBU identification number 89 for identifying the VOB unit 30 to which the navigation pack 41 belongs, and other information 90.

The VOB information 81 is composed of VOB start time information 85 showing reproduction start time on the reproduction time axis of the VOB 10 to which the VOB unit 30 including the navigation pack 41 belongs, VOB end time information 86 showing reproduction finish time on the reproduction time axis of the VOB 10, and other information 87.

The VOBU search information 83 has location information showing recording positions on the DVD 1 of the VOB units which are one unit ahead of and behind the VOB unit 30 to which the navigation pack 41 belongs, and location information showing recording positions of other VOB units 30 on the DVD 1, the other VOB units 30 are to be reproduced in the range from the time 120 seconds before the start time of the VOB unit 30, to which the navigation pack 41 belongs, to the time 120 seconds after the same start time.

In the above-described recording format having the hierarchical structure shown in FIG. 4, each of the segments is freely set and recorded by the producer according to his or her intention. Reproduction by each of these segments based upon a later-described logical structure can lead to a variety of diversified reproductions.

(Logical Format)

Figure 5:
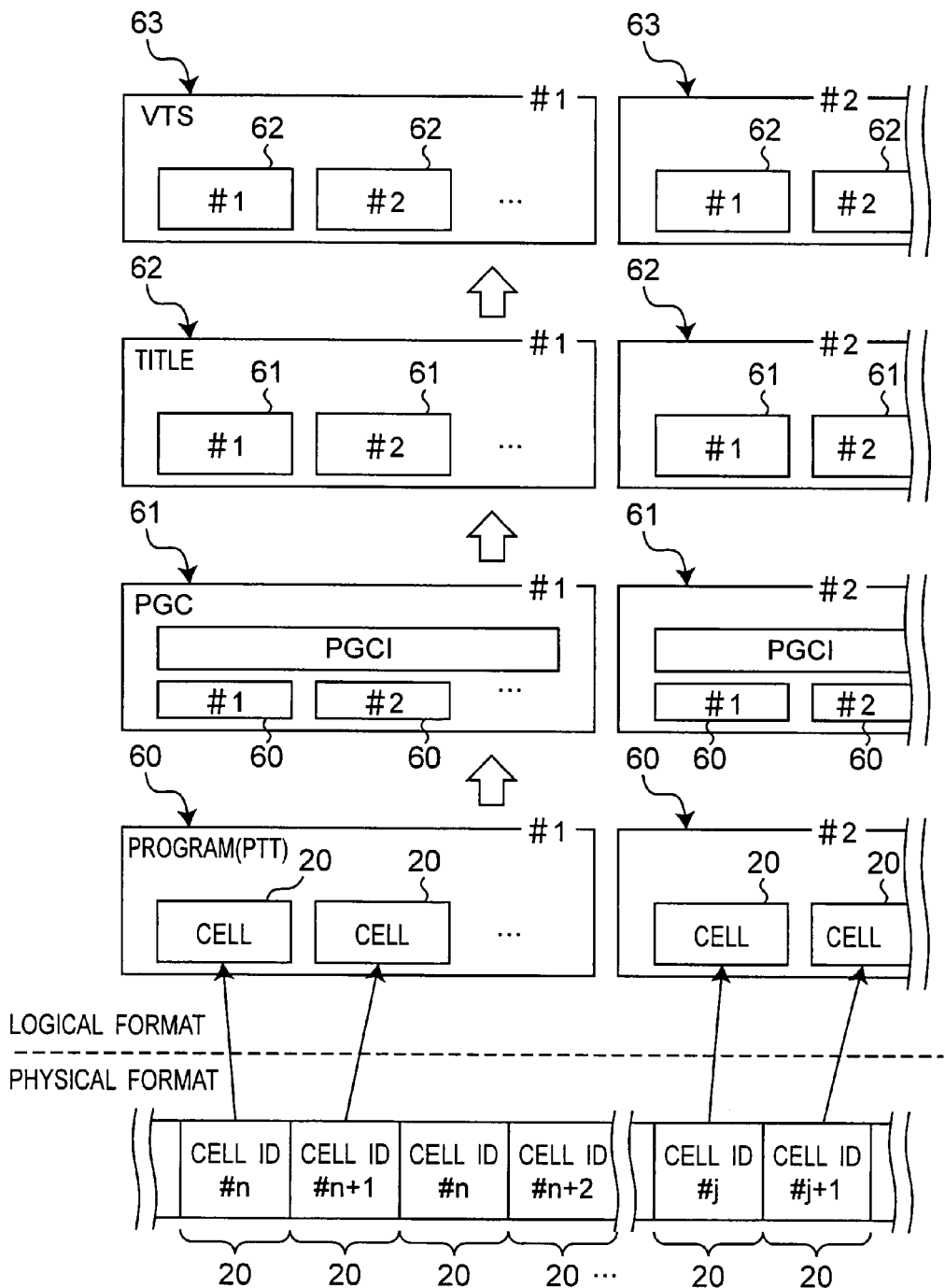
FIG. 5 is a view showing a logical format in the DVD-Video standard.

Next described is a logical format (logical structure) formed with combination of information recorded by physical segments shown in FIG. 2 or FIG. 4 with reference to FIG. 5. It should be noted that the logical structure shown in FIG. 5 is not a structure (physical structure) in which information is actually recorded on the DVD 100. Information (access information or time information, etc) for combining and reproducing each data shown in FIG. 2 (especially cells 20) in the logical structure shown in FIG. 5 is recorded in the control data 11 on the DVD 100.

For the sake of simplifying a description, the hierarchy of FIG. 5 is described from the bottom. The producer selects and combines a plurality of cells 20 shown in FIG. 2, to logically configure one program 60 in line with the intention of the producer. This program 60 is also the minimum logical unit of which segment can be identified and then accessed with a command by the control section 321 in the authoring device 10.

The producer can also define one program 60 or a set of plurality of programs 60 as the minimum unit which is to be freely selected, and watched and listened by the user. That minimum unit is referred to as PTT (Part of Title). Further, since one program 60 is logically composed of a plurality of selected cells 20, the producer can use one cell 20 to a plurality of programs 60, namely reproduce one cell 20 in different plurality of programs 60. That is, the user can perform so-called reuse of cell 20.

When the cells 20 are handled in the physical format shown in FIG. 2, a number of each cell is treated as a cell ID number (shown as cell ID# in FIG. 1). Meanwhile, when the cells 20 are handled in the logical format shown in FIG. 5, a number of each cell is treated as a cell number in the order described in a later-described PGCI.

In the DVD-Video standard, a plurality of programs 60 are combined to logically constitute one PGC (Program Chain) 61 based upon the intention of the producer. The foregoing PGCI is defined by units of the PGC 61. The PGCI includes the order of reproducing the cells 20 in each of the programs 60 in reproduction of the programs 60, an address as a recording position of each of the cells 20 on the DVD 100, a number of the first cell 20 to be reproduced in one program 60, a reproduction method for each of the programs 60, and a variety of commands.

A unique program number is allocated to each of the programs 60 according to the reproduction order. Further, the variety of commands include a command for each PGC 61 or each cell 20 that can be defined by the producer. Further, in the reproduction method for each program 60, when the information is recorded onto the DVD 100 of the present embodiment, the producer can choose either one of normal reproduction, random reproduction and shuffle reproduction, and set the chosen reproduction for each PGC 61. The random reproduction is a reproduction method in which the reproduction order is determined according to random numbers, and the same program 60 may be reproduced a plurality of times. The shuffle reproduction is a reproduction method where the reproduction order is determined according to random numbers as in the case of the random reproduction, but the same program is reproduced only once and is thus not reproduced a plurality of times.

In addition, while the record position of the PGCI on the DVD 100 is in the control data 11 (see FIG. 2) as described above, when the PGCI is related to a menu ins the video manager 2, the record position of the PGCI is in control data (not shown) included in the video manager 2.

Further, each PGC 61 includes, in addition to the PGCI, real data of video and audio data and so on, as combination of the programs 60 (in other words, combination of the cells 20).

In each PGC 61, the reuse of the cell 20 as shown in the above description on the program 60 (namely, the use of the same one cell 20 to different PGCs 61) is possible. As for the cells 20 to be used, the producer can select a method (reproduction of non-sequentially arranged cells) for reproducing the cells 20 in the order irrespective of the recording order on the DVD 100 (e.g. reproducing a later recorded cell 20 prior to the faster recorded cell 20, as well as a method for reproducing the cells 20 in the recording order on the DVD 100 (reproduction of sequentially arranged cells).

In the DVD-Video standard, one title 62 is logically composed of one or a plurality of PGCs 61. The title 62 is, for example, a unit corresponding to one moving image, and complete information with which the producer intends to provide the user of the DVD 100. One or a plurality of titles 62 logically constitute one VTS 63. Each of the titles 62 included in the VTS 63 has a common attribute. For example, movies in different languages with respect to the same one movie correspond to the respective titles 62. Further, information corresponding to one VTS 63 shown in FIG. 5 corresponds to information included in one VTS 3 shown in FIG. 2. Namely, on the DVD 100, all pieces of information logically included in the VTS 63 shown in FIG. 5 are recorded as one VTS 3 shown in FIG. 2.

Based upon the logical format as thus described, the producer designates information segmented in the physical structure to form titles (moving images etc.) to be viewed by the user.

3. Operation of Authoring Device

In the following, the operation of the authoring device 10 is described.

The separator 310 separates an inputted stream into a video elementary stream and an audio elementary stream.

Next, the stream analyzer 322 analyzes the streams outputted from the separator 310 to determine whether or not each of the inputted streams is a stream in conformity with the DVD-Video standard. For example, the following items are checked with regard to the video stream.

<Checking Items concerning DVD-Video Standard>

Whether or not attribute information (horizontal size, vertical size, aspect ratio, display period, bit rate, and so on) has not changed in mid-course.

Whether or not the bit rate does not exceed 10.8 Mbps.
Whether or not a resolution is in the following range.
Horizontal size: 720, 704, 352
Vertical size: 480, 240, 576, 288;
Whether or not the aspect ratio is 4:3 or 16:9.

Whether or not the number of frame images included in the GOP is in the following range:
NTSC—18 or less
PAL—15 or less
Picture structure
Whether or not a picture is included other than I picture, P picture, B picture and D picture.

When the separated video elementary stream and audio elementary stream do not conform to the DVD-Video standard, the decoder 312 and the encoder 313 convert the elementary streams into those in conformity with the DVD-Video standard. The converted streams are inputted into the multiplexer 314. When the separated video elementary stream and audio elementary stream conform to the DVD-Video standard, the elementary streams are directly transmitted to the multiplexer 314.

The multiplexer 314 receives the video elementary stream, the audio elementary stream and the scenario information 311 to construct an incomplete VOB 318, analysis information 315 of the stream, and control information 319. Further, the multiplexer 314 multiplexes the video elementary stream and the audio elementary stream in the buffer memory 314a of the multiplexer 314 to construct the VOB units 30. At that time, the multiplexer 314 analyzes the video elementary stream and audio elementary stream to generate the navigation pack 41 in conformity with the DVD-Video standard and incorporate the navigation pack 41 into the VOB units 30.

However, it is not possible to construct information of a navigation pack concerning a stream (i.e. VOBU) which is not yet processed. Thereat, the multiplexer 314 outputs a stream including continuing VOB units 30 with incomplete navigation packs 41. The VOB 318 outputted from the multiplexer 314 is thus an incomplete VOB. At that time, the multiplexer 314 inserts dummy information into a region of the VOB 318 corresponding to an incomplete navigation pack. The dummy information is, for example, null data.

Here description is made to information of the navigation pack 41 regarding the stream not yet processed, which cannot be constructed in the multiplexer 314. The information of the navigation pack 41 which cannot be constructed in the multiplexer 314 includes VOBU search information 83, synchronous reproduction address information 84, and VOB end time information 86.

The VOBU search information 83 needs to include: location information showing record positions on the DVD 100 of VOB unit which are one unit ahead of and behind the VOB unit 30 to which the navigation pack 41 belongs; and location information showing record positions on the DVD 1 of other VOB units which are to be reproduced in the range from the time 120 seconds before the start time of the VOB unit 30 to the time 120 seconds after the start time. However, since the VOB unit 120 seconds after the start time of a VOB unit 30 is not been processed at the time of processing of the VOB units 30, the location information thereof is unconfirmed. Therefore, the VOBU search information 83 is not constructed during multiplexing in the multiplexer 314.

The synchronous reproduction address information 84 needs to include location information of the audio data 43 and the sub picture data 44 which are reproduced in synchronization with the video data 42 of the VOB unit 30 to which the navigation pack 41 belongs. However, since VOB units after that VOB unit 30 is not yet been processed at the time of processing the VOB unit 30, location information of those VOB units is unconfirmed. Therefore, the synchronous reproduction address information 84 is not constructed during multiplexing in the multiplexer 314.

Since the VOB end time information 86 shows completion of reproduction on the reproduction time axis of the VOB 10, it is not possible to determine the information until the whole stream is processed.

The VOBU search information 83, the synchronous reproduction address information 84 and the VOB end time information 86 which cannot be constructed in the multiplexer 314, are compensated by the disk image completing section 316 after generation of the incomplete VOB. For this purpose, the multiplexer 314 constructs the analysis information 315 of the video elementary stream and the audio elementary stream based upon the contents of the streams simultaneously with construction of the incomplete VOB 318. The analysis information 315 is stored into a predetermined memory.

FIG. 6 shows the structure of the analysis information 315 of the stream. The analysis information 315 includes, concerning the whole VOB units 30, VOBU identification number 399, location information 400, VOBU start time information 401, an audio pack PTS 402, and audio pack location information 403. Further, the analysis information of the stream includes VOB end time information 404 which sores reproduction end time of a final video frame. Since a plurality of audio packs are included in each VOB unit, a plurality of audio pack PTSs 402 as well as a plurality of pieces of audio pack location information are included in each VOB unit.

Here, the VOBU identification number 399 is an identification number for each VOB unit, and used for management of information in the analysis information 315. The location information 400 is information concerning a position of each VOBU, and used for construction of the VOBU search information 83. The VOBU start time information 401 is PTM of a head video pack in the VOB. The audio pack PTS 402 is PTS of the audio pack in the VOB unit. The audio pack location information 403 is location information of the audio pack in the VOB unit. The VOBU start time information 401, the audio pack PTS 402 and the audio pack location information 403 are used for construction of the synchronous reproduction address information 84.

Further, the multiplexer 314 constructs the control information 319 which includes information for searching PTT, information for reproducing a menu, and title management information, from the scenario information 311 and the information of VOB 318 generated.

The multiplexer 314 records the constructed VOB 318 and the control information 319 as a disk image 320a into the data storing section 320 through the disk image controller 317. The disk image 320a is a series of data which is generated in conformity to the DVD standard and finally recorded on the DVD 100. It includes the VOB 318, the control information 319 and the video manager 324. The video manager 324 is generated from the scenario information 311 by the video manager generating section 323.

As thus described, the multiplexer 314 records the inputted series of streams as an incomplete disk image, while converting the streams into the DVD-Video standard, and simultaneously records the analysis information 315.

When the recording of the incomplete disk image by the multiplexer 314 is finished, the disk image completing section 316 completes the disk image. Namely, the disk image completing section 316 generates the VOBU search information 83, the synchronous reproduction address information 84, and the VOB end time information 86 with reference to the analysis information 315, and rewrites dummy information in the navigation pack 41 of the incomplete VOB 318 stored in the data storing section 320 with the above generated information 83, 84 and 86, thereby completing a disk image 320a.

The process of the disk image controller 317 is specifically described. The disk image controller 317 manages access to the disk image 320a, and allows the VOB 318 and control information 319 which are generated as file to be accessed as virtual DVD disk. Provision of the virtual disk by the disk image controller 317 enables the multiplexer 314 to grasp the location information showing a position at which the VOB unit 30 is disposed next during construction of the VOB unit 30.

The DVD-Video standard requires that the VOB is a file less than 1 GB and the VOBS is composed of nine VOB files at the maximum. In the conventional method, the VOB is outputted once on a hard disk and then the file is divided, in the final process, to be under 1 GB, thus generating the VOBS. Therefore, it is necessary to generate VOB file as intermediate data on the working area, in addition to the final disk image. The disk image controller 317 divides a stream outputted from the multiplexer 314 into files on the hard disk such that the stream is not 1 GB or more, and manages each VOB file as a sequential VOBS. However, when the sequential stream is divided into a plurality of VOB files as thus described, arithmetic processing is required for acquiring location information, thereby complicating the data conversion process. Further, the location information managed in the navigation pack 41 is location information on the DVD 100 in which data is actually arranged. Therefore, the disk image controller 317 allows the access to a file 500 arranged on a disk image as shown in FIG. 7, as a virtual disk. Thereby, the multiplexer 314 becomes capable of arranging data in the disk image without consciousness of the file system. In FIG. 7, VTS_01_1.VOB to VTS_01_4.VOB are those divided by the disk image controller 317 according to the size limit. The set of VIDEO_TS.IFO, VIDO_TS.BUP, and VIDEO_TS.VOB corresponds to a video manager.

As described above, the authoring device of the present embodiment, while converting an inputted stream into the DVD-Video standard, firstly generates and records an incomplete disk image (first scanning). In the incomplete disk image, dummy information (e.g. null data) is recorded to incomplete reproduction control information. Subsequently, the whole incomplete disk image is scanned (second scanning), and dummy information is then rewritten to adequate information, thus to generate a complete disk image. As thus described, since the complete disk image is generated only by two-time scanning of the whole stream (two-pass process), a working area with only the size of the disk image is required, thereby enabling reduction in processing time and working area in the embodiment as compared with the conventional method.

Although the specific embodiment of the present invention has been described, a large number of modified examples, correction and other utilization are obvious for the skilled person. Therefore, the present invention is not limited to the specific disclosure here, but limited only by the attached claims. The present application is related to Japanese Patent application No. 2004-237159 (filed on 17 Aug. 2004), and the contents of which are incorporated herein by reference.

INDUSTRIAL APPLICABILITY

The present invention is applicable to an authoring device for converting a stream in one format into another format and then record the stream in the converted format.

The invention claimed is:

1. An authoring method of recording an input stream as a stream in a predetermined format to a recording medium, the authoring method comprising:

separating the input stream into a video stream and an audio stream;

generating content information by multiplexing the video stream and the audio stream, generating control information for managing reproduction of the stream, and generating incomplete disk image data based on the content information and the control information, the incomplete disk image data (i) being a series of data which is basically in conformity with the predetermined format and (ii) including reproduction control information which is defined by the predetermined format and which includes a part of the reproduction control information that is lacking;

generating analysis information required for generating the lacking part of the reproduction control information, simultaneously with the generating of the incomplete disk image data; and generating complete disk image data by rewriting the lacking part of the reproduction control information in the incomplete disk image data with reference to the analysis information after the generating of the incomplete disk image data, wherein the predetermined format is a format according to which the reproduction control information is included in the stream.

2. The authoring method according to claim 1, wherein, when the input stream does not conform to the predetermined format, (i) the separated video stream and the separated audio stream are decoded, (ii) the decoded video stream and the decoded audio stream are encoded in an encoding method in conformity with the predetermined format, and (iii) the encoded video stream and the encoded audio stream are multiplexed to generate the incomplete disk image data.

3. The authoring method according to claim 1, wherein dummy information is recorded to the lacking part of the reproduction control information in the incomplete disk image data.

4. The authoring method according to claim 3, wherein the dummy information is rewritten to an adequate value with reference to the analysis information.

5. The authoring method according to claim 1, wherein the disk image is generated while the stream is divided in to a data size defined by the predetermined format.

6. The authoring method according to claim 1, wherein the predetermined format conforms to a DVD-Video standard.

7. A non-transitory computer readable recording medium having stored therein a computer program for causing a computer execute the authoring method according to claim 1.

8. An authoring device for recording an input stream as a stream in a predetermined format to a recording medium, the authoring device comprising:

a separator for separating the input stream into a video stream and an audio stream;

a multiplexer for (i) generating content information by multiplexing the video stream and the audio stream, (ii) generating control information for managing reproduction of the stream, (iii) generating incomplete disk image data based on the content information and the control information, the incomplete disk image data (a) being a series of data which is basically in conformity with the predetermined format and (b) including reproduction control information which is defined by the predetermined format and which includes a part of the reproduction control information that is lacking, and (iv) generating analysis information required for generating the lacking part of the reproduction control information, simultaneously with the generating of the incomplete disk image data; and a disk image completing section for generating complete disk image data by rewriting the lacking part of the reproduction control information in the incomplete disk image data with reference to the analysis information after the generating of the incomplete disk image data, wherein the predetermined format is a format according to which the reproduction control information is included in the stream.

9. The authoring device according to claim 8, further comprising a disk image controller for generating the disk image while dividing the stream in to a data size defined by the predetermined format.

* * * * *